United States Patent [19]

Städtler

[11] Patent Number: 5,014,861

[45] Date of Patent: May 14, 1991

[54] MODULAR SYSTEM FOR SETTING UP FURNITURE, RACKS, FRAMEWORKS AND THE LIKE

[76] Inventor: Marc-Michael Städtler, D-8205, Alte Rathausstr. 22, Kiefersfelden, Fed. Rep. of Germany

[21] Appl. No.: 155,617

[22] Filed: Feb. 12, 1988

[30] Foreign Application Priority Data

Feb. 16, 1987 [DE] Fed. Rep. of Germany ....... 3704831

[51] Int. Cl.$^5$ ............................................... A47F 5/14
[52] U.S. Cl. .................................. 211/182; 403/231; 211/183
[58] Field of Search ............... 211/182, 189, 190, 191, 211/183; 403/231, 192, 187, 391; 108/111; 160/135; 256/68, 69; 248/68.1, 230

[56] References Cited

U.S. PATENT DOCUMENTS

| | | |
|---|---|---|
| 242,831 | 6/1881 | Lockwood ............................ 256/69 |
| 3,604,687 | 9/1971 | Moore ............................... 256/68 X |
| 3,856,244 | 12/1974 | Menshen . |
| 3,945,291 | 3/1976 | Zickos . |
| 4,142,813 | 3/1979 | Laborde . |
| 4,176,753 | 12/1979 | Godfrey ............................. 211/182 |
| 4,493,425 | 1/1985 | Yoshida ........................... 211/182 X |
| 4,595,162 | 6/1986 | Matsumura et al. . |
| 4,597,690 | 7/1986 | Girard . |
| 4,653,652 | 3/1987 | Avati .............................. 211/182 X |

FOREIGN PATENT DOCUMENTS 2053389 5/1972 Fed. Rep. of Germany ...... 211/182
1157664 7/1969 United Kingdom ................ 211/182

*Primary Examiner*—Sarah A. Lechok
*Attorney, Agent, or Firm*—Gifford, Groh, Sprinkle, Patmore and Anderson

[57] ABSTRACT

The modular system comprises plural components adapted to be joined to each other by supporting and retaining members and to be mounted on stands at any desired level above ground.

It is intended to further develop the modular system such that its versatility in respect of the provision and adaptation of working-place equipment is substantially improved, while at the same time the number of basic elements necessary for assembly is reduced. This is achieved in that each retaining member forms at least one multi-part combinable nodal-point body having at least one through-bore, the plane or planes of division of said body extending through said through-bores, and in that each supporting member is rod-like or a plate-like structural body adapted to be inserted into the bipartite through-bore of the nodal-point body and to be securely joined thereto by clampingly joining the individual parts of the nodal-point body.

The modular system is also suited for providing frameworks for top, wall and bottom fixing brackets and for setting up exterior and interior scaffolding, sales booths and non-stationary partition walls.

7 Claims, 17 Drawing Sheets

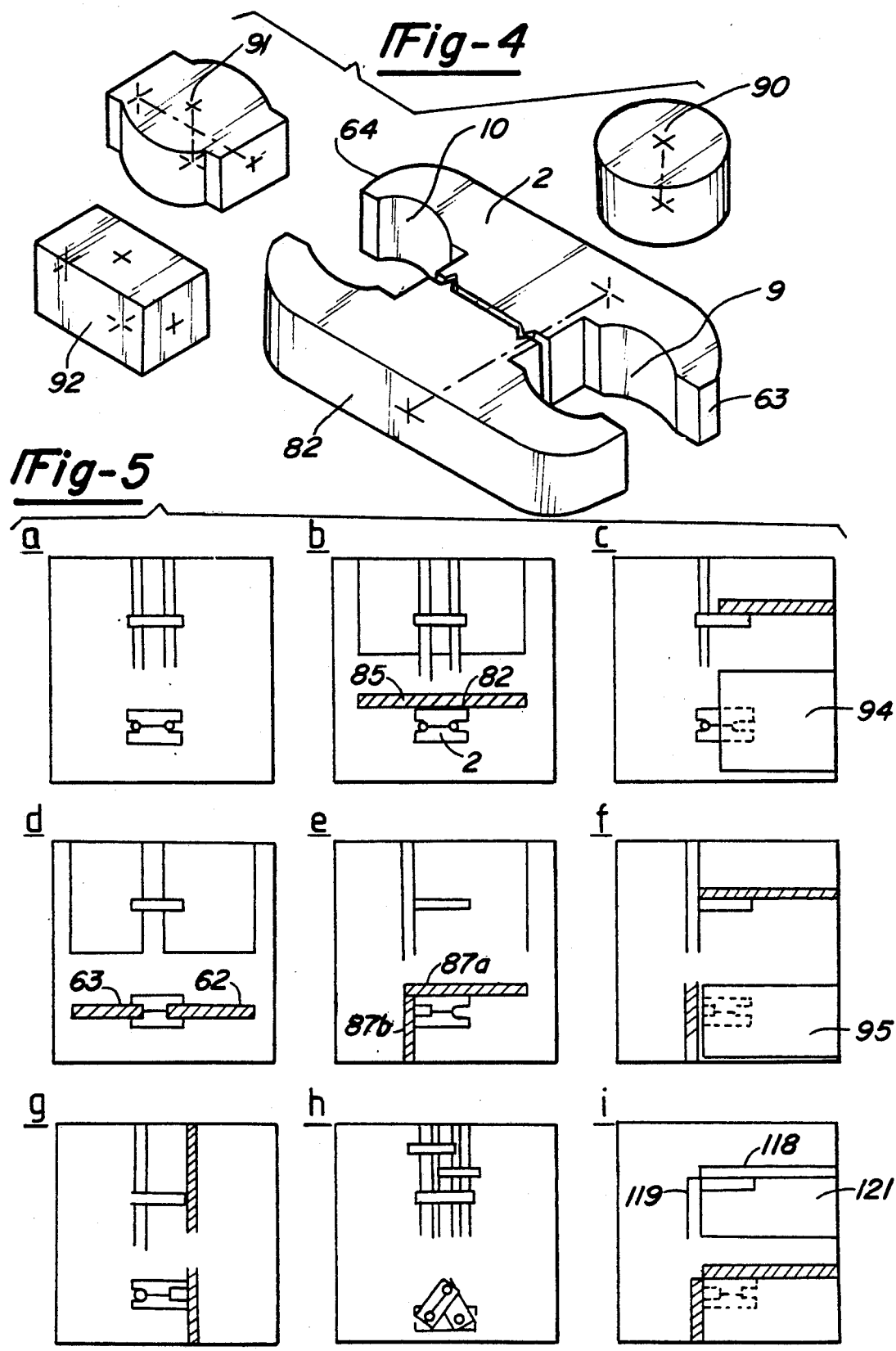

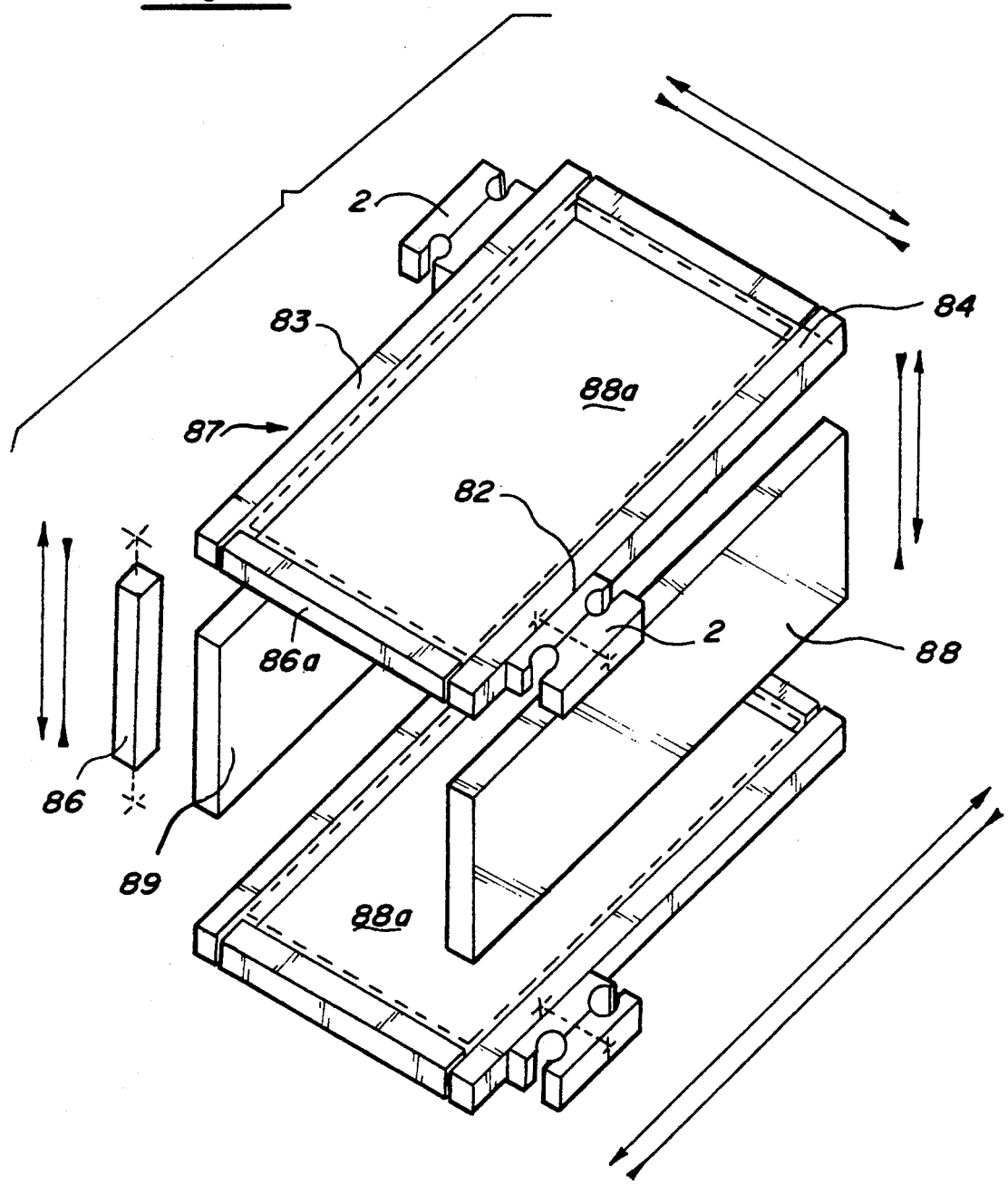

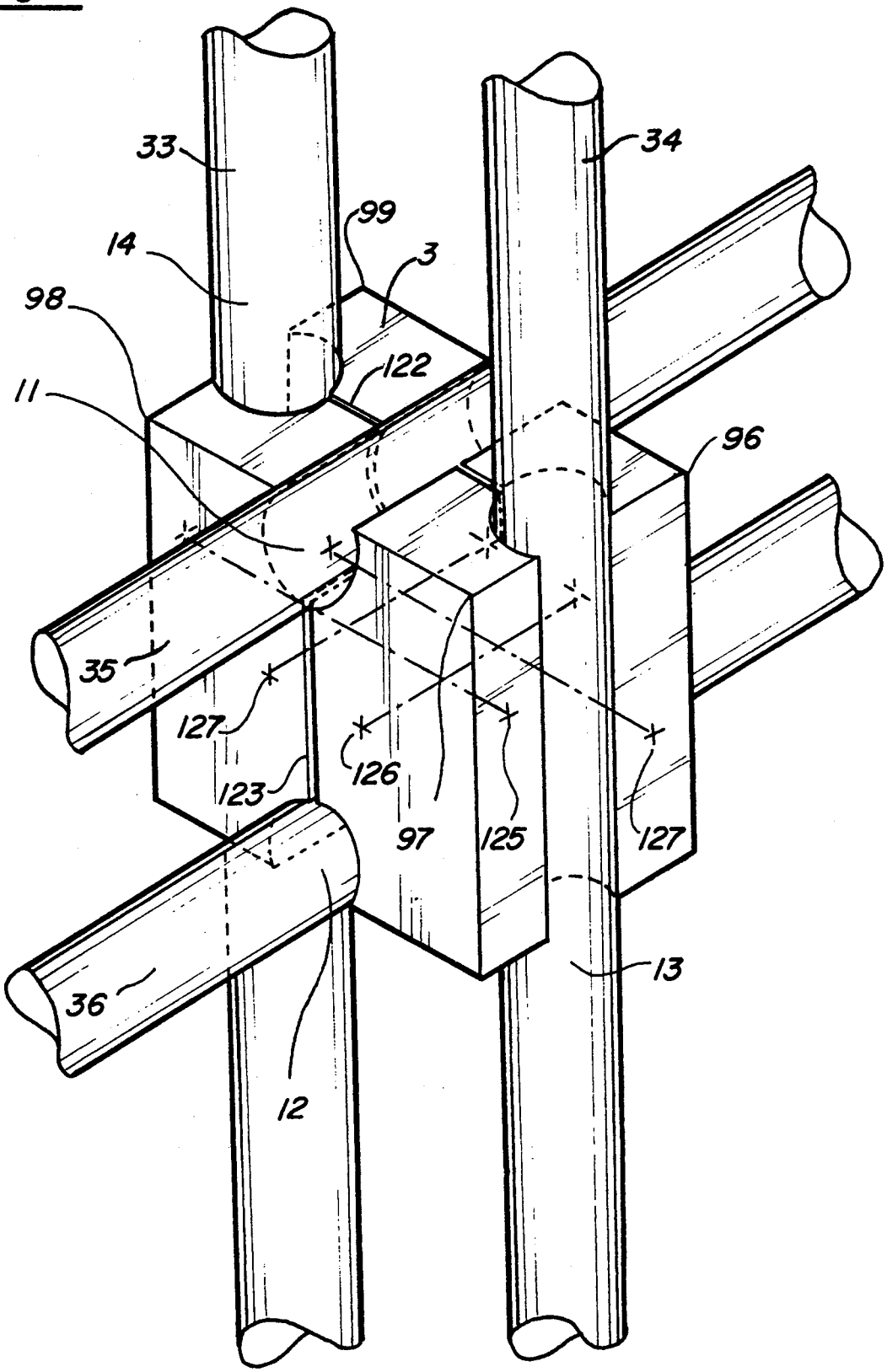

MODULAR SYSTEM FOR SETTING UP FURNITURE, RACKS, FRAMEWORKS AND THE LIKE

BACKGROUND OF THE INVENTION

The present invention relates, to a modular system for setting up furniture, racks, frameworks and the like, especially office working-place equipment and the like, comprising a plurality of components which are adapted to be interconnected by supporting members and retaining members and to be mounted on stands at certain levels above ground.

It is the objective of known systems of this kind (DE-OS 3,135,576) to realize highly versatile furniture which optimally satisfies the objective and subjective demands of the users. Systems of this kind start from the concept that such modular systems for furniture should be able to set up working places for any conceivable occupational group rapidly and economically, such furniture including, for instance, desks, filing cabinets, conference tables, shelves, side tables, boxes, cabinets for office supplies, chairs and the like, and in addition to that it should be possible to readily adapt these articles to varying working or working place conditions. Such adaptations are especially necessary in the case of equipment for data processing, since computer tables, for example, should remain usable already for economic reasons even though the computers and accessories are subject to rapid changes due to the fast development in this field. Since even relatively small companies today make use of computer controlled machines, the furniture for personnel should be adaptable to terminals, monitors, printers and the like while still necessary working areas for other activities should not be excessively restricted thereby.

Although the modular system of the species-forming kind offers a solution of these objectives by means of special supporting and frame devices which are used to retain various components, this solution does not meet every conceivable design and in particular renders the system rather expensive in respect of the required structural elements.

From the U.S. Pat. Specification No. 3,666,339 a furniture design is known which permits limited adaptation of certain articles of furniture to their respective intended use, for example a metal desk provided with a clip-on attachment which is connected to the corners of a desk top for providing a desk working place. But this structure does not offer the possibilities of a modular system, and in addition to that it does not possess the necessary versatility typical for the setting up of any desired articles of furniture from a relatively small number of basic elements.

SUMMARY OF THE INVENTION

It is therefore the object of the present invention to further improve the modular system of the specified kind in such a way that the versatility thereof in the setting-up and adaptation of working place furniture and equipment is substantially improved, while at the same time the number of different basic elements necessary for setting up such furniture is reduced; in addition to that the novel system should also be suited for cases of use which extend beyond the field of fittings and furniture, for instance for the manufacture of framework for top, wall and floor fixing brackets, and for the assembly of scaffolding for exterior and interior use, and for the assembly of sales booths and non-stationary partitions at trade fairs and other purposes of exhibition common in trade.

In accordance with the invention the specified object is solved in that each retaining member forms at least one multi-part composite nodal-point body including at least one through-bore, the plane or planes of division of said body extending through said through-bores, and in that each supporting member is a rod-like structural body adapted to be inserted in the bipartite through-bore of the nodal-point body and to be securely joined to the latter by clampingly securing the individual parts of the nodal-point body.

The system according to the present invention is substantially composed of only two basic members, i.e. a retaining or clamping member configured as a nodal-point body and a supporting member configured as a rod- or plate-like structural body adapted to be joined to the nodal-point body upon clamping engagement of the parts thereof, which may be done by bolting. By skillful combination of these two basic members, which is explained in detail by way of practical examples illustrated in the drawing, furniture of any desired configuration and size may be set up.

In accordance with an advantageous embodiment of the present invention the nodal-point body is a polygonal plate which appropriately has square or rectangular cross-section, wherein two of the opposed sides are provided with at least one respective through-bore extending through the thickness of the plate, and the plate is parted along the straight line joining the two centres of these through-bores.

In accordance with a further embodiment the plate may have a lateral extension which forms a bracket for accommodating a wall or base plate.

Suitably, at least one of the through-bores has circular cross-section for accommodating a tube as the supporting member, said member forming the leg of a piece of furniture such as a table leg. Also, it is possible to provide one of the through-bores with a non-circular cross-sectional profile which is suited to receive a plate-like body forming a wall or base element.

For the assembly of frame members, which are filled, for instance, with wooden or metal panels in order to provide box-like structures, it has proven advantageous to provide one side of the nodal-point body configured as a square or rectangular plate, which side is free from through-bores, as an abutting surface for at least one rod-like or plate-like supporting member which upon assembly of the bipartite plate can be joined thereto.

Moreover, at least some of the through-bores of the nodal-point bodies may be closed by a fitting piece matched with the bore cross-section, a wall or base panel being mountable to said fitting piece so that, when said wall or base panel rests on the plate-like nodal-point body, the positioned panels can already be retained by latching engagement of the fitting pieces.

Such plate-shaped nodal-point bodies are easily interconnected by rod-like structural parts which are inserted through corresponding through-bores of adjacent nodal-point bodies.

Advantageously, the multi-part joinable nodal-point body may also be configured as a cube divided into four equal parts along two mutually orthogonal planes, at least two respective parallel through-bores extending through said nodal-point body on four of the six sides thereof which oppose each other in pairs, said through-bores serving to respectively receive at least one supporting member adapted to be securely joined to the nodal-point body when the four parts of the cube are combined. In this case, too, the supporting members are tubular and/or plate-like bodies and constitute, for instance, legs or wall portions of the pieces of furniture.

In accordance with a further advantageous embodiment of the present invention the multi-part combinable nodal-point body may be a parallelepiped consisting of two equal parts and having in its plane of division two pairs of through-bores extending therethrough which intersect each other at right angles and penetrate through four of the six outer sides of the body. Abutting structural bodies or plate-like structural bodies can be secured within said four through-bores when the two halves of the parallelepiped are joined to each other.

The nodal-point body in the form of a parallelepiped composed of two equal halves may also, instead of rectangular cross-section, have triangular cross-section, in which case through-bores extend therethrough in the plane of division of the body and in parallel to the outer sides of the triangle; advantageously, abutting rod-like structural bodies for constituting a framework can be secured in said through-bores.

Finally, it has also proven advantageous to impart to the multi-part combinable nodal-point body the shape of a cylinder which is composed of four identical, axially symmetrical parts and through which four identical, equidistant, axially parallel through-bores extend while four additional through-bores extend therethrough which intersect each other at right angles and extend at right angles to the axially parallel through-bores and penetrate the cylinder circumference. The four identical, axially symmetrical parts of the cylinder may also have a common axial bore in which a cylindrical core body serving as joining member for these four parts is inserted.

The invention will be described in detail hereinbelow by way of embodiments thereof illustrated in the drawing, in which:

FIG. 1 is a schematic perspective view of a two-part plate-like retaining element including two rod-shaped structural bodies clamped therein, FIG. 2 is a schematic perspective view of a plate-like retaining element including a rod-shaped and a plate-shaped structural body clamped therein, FIG. 3 is a perspective view of a plate-like retaining element similar to that shown in FIG. 1 but with a lateral extension provided thereon, FIG. 4 is a perspective view of a plate-like retaining element including through-bores of non-circular cross-section and fitting pieces for insertion therein, FIG. 5a-i are schematic diagrams of examples showing the assembly of the plate-like retaining elements with rod- and plate-shaped structural bodies (respectively as plan and end views), FIG. 6 is an explosive view of two frame members which can be assembled from plate-like retaining elements and rod-like supporting elements and can be supplemented by lateral plate-like wall members to form a box-shaped body, FIG. 7 is a schematic perspective view of a nodal-point body to be used as retaining element, configured like a cube divided into four equal parts and including rod-like structural bodies seated in the through-bores and intersecting each other at right angles, FIG. 8 is a perspective view of a nodal-point body which forms a parallelepiped composed of two equal halves, FIG. 9a-f are diagrammatic illustrations of applications of the nodal-point body shown in FIG. 8 in conjunction with rod-like and plate-like structural bodies, FIG. 10 is a schematic plan view of four parallelepipedic nodal-point bodies of FIG. 8, which are joined by rod-like structural bodies, FIG. 11 is a perspective view of a desk as a piece of furniture, assembled from retaining elements and supporting elements of the kind according to the invention, FIG. 12 is a schematic perspective view of a rack for data processing devices assembled from the retaining and supporting elements according to the invention, with a possible attachment of a working top in front, FIG. 13 is a schematic perspective view of a nodal-point body configured as a two-part parallelepiped of triangular contour, FIG. 14a-f are schematic diagrams of practical usage of the parallelepiped of FIG. 13 as a joining member for rod- or plate-like structural bodies, FIG. 15a-d are schematic diagrams of framework brackets and stands composed of parallelepipedic elements of FIG. 13 and rod-like bodies, FIG. 16 is a schematic perspective view of a two-part parallelepiped of triangular contour similar to that shown in FIG. 13, including through-bores passing through the side faces of the parallelepiped, FIG. 17a-c are plan views of practical examples using the parallelepiped according to FIG. 16, FIG. 18 is a schematic perspective view of a nodal-point body configured as a multi-part cylinder, FIG. 19 is a plan view showing the nodal-point body of FIG. 18, FIG. 20 is an explosive view of the nodal-point body of FIGS. 18 and 19, FIG. 21a-f are plan views and end views, respectively, of practical examples using the nodal-point body configured as a multi-part cylinder, and FIG. 22a-e are schematic perspective views as well as front and plan views of various pieces of furniture constituting examples of the versatility of the modular system according to the present invention.

DETAILED DESCRIPTION OF THE INVENTION

For providing pieces of furniture, racks, framework and the like, especially working place furniture and equipment for offices and the like of the kind illustrated in FIGS. 11 and 12, retaining or clamping elements are used which consist of at least one multi-part nodal-point body adapted to be combined and having at least one through-bore, the plane of division of this multi-part nodal-point body extending through said through-bores, and supporting elements are used in the form of rod-like or plate-like structural bodies adapted to be inserted into the two-part through-bore of the nodal-point body and to be securely joined to the latter by lockingly engaging the individual parts of the nodal-point body.

FIG. 1 shows such a nodal-point body 1 configured as a rectangular plate having rounded corners, said body consisting of the two equal-sized halves 1a and 1b disposed adjacent each other and in mirror-inverted relation to the plane of division. Two opposed sides of the four side surfaces of the nodal-point body 1 are provided with through-bores 7, 8 which extend in the direction of thickness of the rectangular plate and through which rod-like structural bodies 31, 32 constituted by tubes are inserted. The through-bore halves are respectively formed in the one part 1a and the other part 1b of the plate, which means that the plane of division 114 extends along the joining line of the two bore centres.

The two rod-like structural bodies 31 and 32 are securely joined to the nodal-point body 1 by bolting the two parts 1a and 1b together with the help of a bolt indicated at 115 and penetrating the plane of division 114. By undoing this bolted joint it is possible, if desired, to vary the position of the nodal-point body as desired relative to the structural bodies 31 and 32 which together may be a table or chair leg. This does not mean that upon unscrewing of the bolt the two parts 1a and 1b actually must be separated from each other in order to permit a change of position, the bolt need only be loosened so that the clamping effect acting on the structural bodies 31 and 32 by way of the wall of the through-bores 7 and 8 can be eliminated or in any case considerably reduced.

FIG. 3 shows a further improvement of the structural principle illustrated in FIG. 1, in which the half of the nodal-point body 120 indicated at 1b in FIG. 1 is provided with a lateral extension constituting a bracket 74 for receiving a wall or base plate 75 which is bolted to the bracket 74 at 116 and 117. For the rest, this nodal-point body likewise has through-bores 71, 72 passing therethrough on the two opposed sides 67 and 68 for accommodating the rod-like structural bodies 37, 38 which can be securely clamped to the nodal-point body by way of the bolted joint described in FIG. 1.

Of course, the other end of the wall or base plate 75 may rest on a bracket 74 of identical or similar configuration to that shown in FIG. 3, said further bracket being again part of a nodal-point body which is supported on at least one and suitably two or more rod-like structural bodies of the kind shown at 37 and 38. In this way a working table can be arranged at any desired adjustable height, said working table either itself constituting the piece of furniture to be provided or being part of any desired working place equipment.

The embodiment of the nodal-point body 2b illustrated in FIG. 2 differs from the one shown in FIG. 1 only in that the two through-bores 69 and 70 at the two opposed end faces 65 and 66 of said body do not have circular cross-section but have profiled cross-section which is shaped in such a way that it may be used for receiving a rod-like structural body 39 of round cross-section and a plate-like structural body 47 the contours of which are only indicated in FIG. 2. Like the rod-like structural body, the plate-like structural body is also securely clamped by bolting the two parts of the nodal-point body 2b.

It is conceivable that the structural body 39 is a leg of a two-legged stand which with the help of two nodal-point bodies 2b may be used, for instance, to mount a board at variable height above ground.

The nodal-point body 2 perspectively illustrated in FIG. 4 is comparable as to shape with the nodal-point body 2b of FIG. 2, i.e. it is also divided into two equal parts in a plane extending in parallel to its longitudinal side 82 and through the two centres of the through-bores 9 and 10, said parts being adapted for bolting or clamping to each other and also for welding provided the joint is not meant to be separated later. The fitting pieces 90, 91 and 92 are made to fit into the through-bores and are suitably made by punching from the plate-like nodal-point body during manufacture of the through-bores. One fitting piece 91 is configured such that it completely fills the cross-section of the bore, i.e. its outer ends are flush with the end faces 63 and 64 of the nodal-point body 2.

Such fitting pieces may be bolted with wall or base plates of the kind illustrated at 94 and 95 in FIGS. 5c and 5f so as to snap into the respective through-bore 9 or 10 so that the wall or base plate is not retained in vertical position on the nodal-point body 2 in the way of the plate 47 in FIG. 2 but is retained in horizontal position while a rod-like structural body 39 passes through the second through-bore 9. The FIGS. 5a to 5i show practical examples of possible joints of nodalpoint bodies of the kind indicated at 2, 2a and 2b in FIGS. 1 to 4 with rod-like and/or plate-like structural bodies.

FIG. 5a shows a plan view and an elevation of the nodal-point body 2 including two rods or tubes passing through the through-bores thereof, FIG. 5b shows a design detail which is comparable with FIG. 5a but in which a plate 85 is mounted on the side 82 of the nodal-point body which plate upon bolting of the two parts of the nodal-point body 2 can be secured simultaneously to said body.

FIG. 5c shows the already mentioned case in which a plate-shaped structural body 94 is supported after assembly of the fitting piece 91, which engages in the through-bore 10 provided therefor.

FIG. 5d shows two plate-like structural bodies of the kind illustrated at 47 in FIG. 2, which are inserted into the opposite through-bores 69 and 70 of a nodal-point body 2b.

In FIG. 5e, a nodal-point body 2 or 1 of the kind illustrated in FIG. 1 and FIG. 4 is used to join two plate-like structural bodies 87a, 87b which abut each other at right angles.

FIG. 5f is a plan view and an elevation of the case in which a plate-like structural body 95 abuts an upright wall member and is supported thereby by means of a nodal-point body.

FIG. 5g shows the possible joint between an existing rod-like or tubular structural body and a plate via a nodal-point body by means of a fitting piece which engages in one of the through-bores of the nodal-point body.

Figure 1:
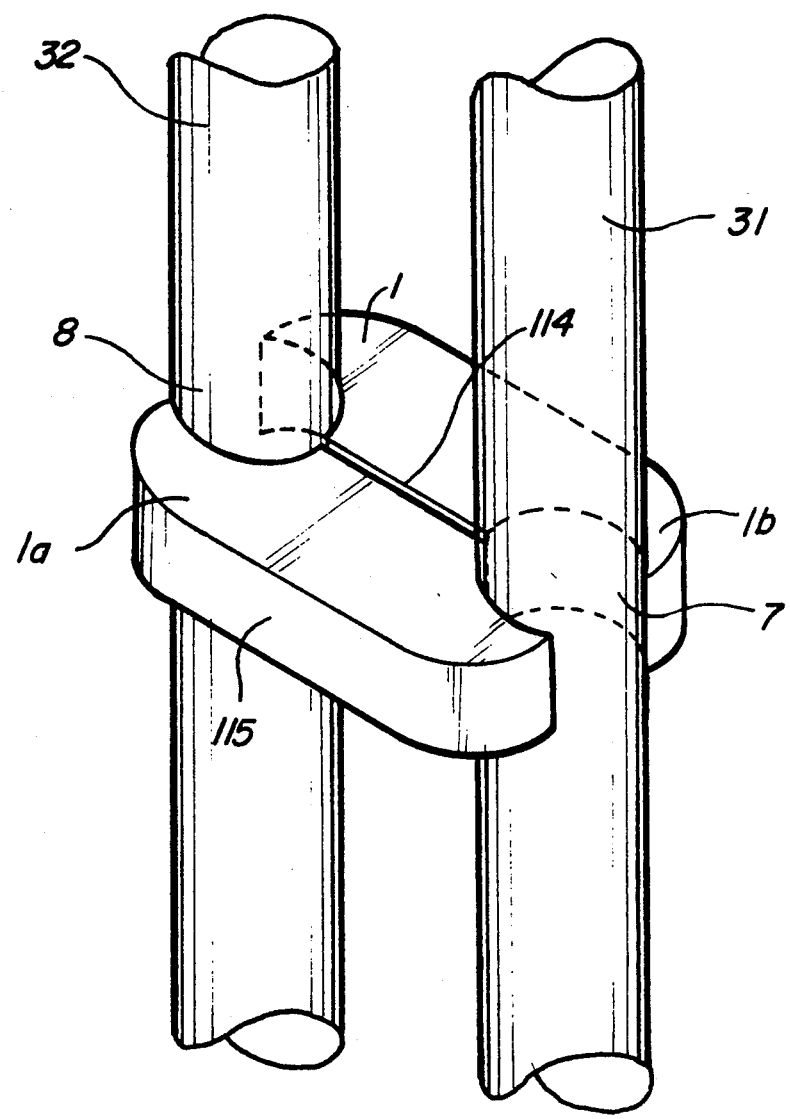
Figure 2:
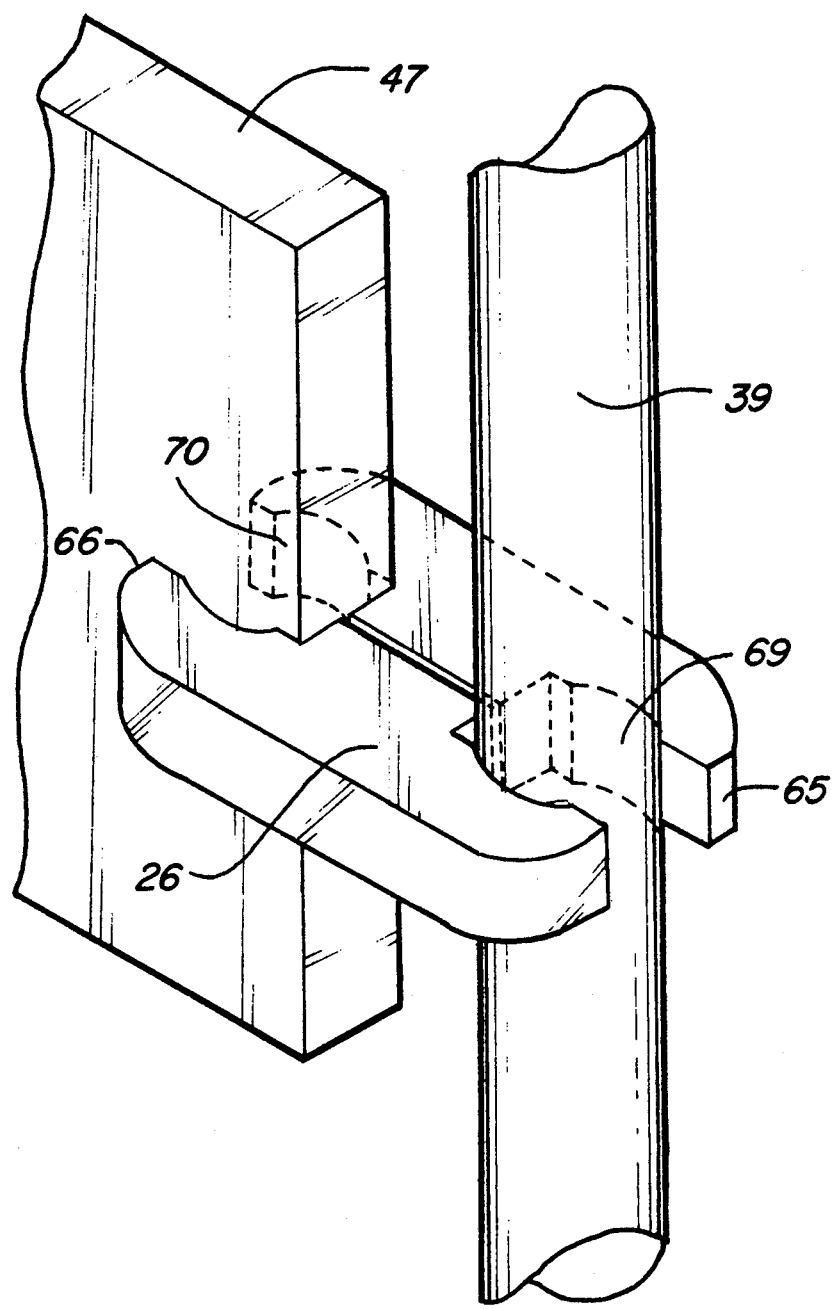
Figure 3:
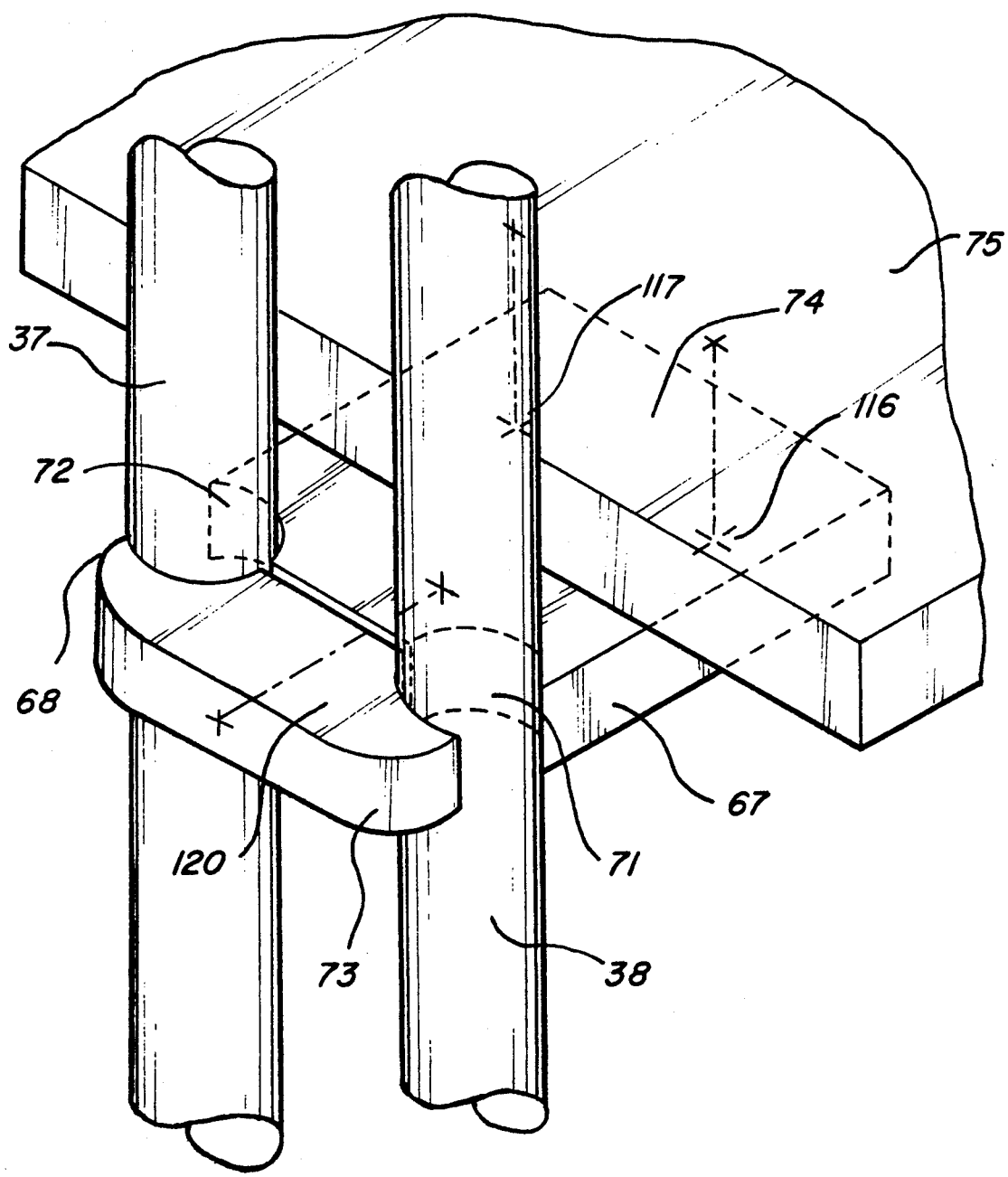

FIG. 5h likewise shows in plan view and in elevation the combination of three mutually spaced adjacent rod-like structural bodies of the kind referenced 31, 32, 37, 38 and 39 in FIGS. 1 to 3 to form a structure having three parallel legs, the individual plate-like nodal-point bodies being disposed above one another.

FIG. 5i shows a structural detail as a plan view and an elevation, said detail forming the corner of a cube the table-like top 118 of which can be joined by means of a nodal-point body 2, 2a, 2b, 120 both to the sidewall plate 110 and to the rear wall plate 121.

The explosive view of FIG. 6 shows in perspective the assembly of a plurality of plate-like nodal-point bodies 2 with rod-like supporting members 83, 84, 86 to form a frame body 87, in which—as explained by means of FIG. 5b—upon bolting of the two halves of the two-part nodal-point body 2 the rod-like supporting member 84 is simultaneously bolted to the side 82 and the structural side bodies 88, 89 are connectable as sidewalls to the upper and lower frame body 87 by means of fitting pieces mounted on the end faces of said structural bodies and adapted to be inserted into the through-bores.

To complete the parallelepipedic structure provided in this way, the lateral rod-like supporting members 86 and 86a are bolted to the longitudinally extending rod-like supporting members 83 and 84.

The rod-like supporting members 83, 84, 86, 86a may also be provided with a recess for accommodating wall panels 88a, which are indicated in dashed lines in FIG. 6 and which in their turn may be made from any desired solid material, for example even glass.

Either instead of a plate-like two-part nodal-point body of the kind shown in FIGS. 1 to 6 or in combination therewith, a nodal-point body 3 illustrated perspectively in FIG. 7 may be used which is divided along two mutually orthogonal planes 122 and 123 into four equal parts 96, 97, 98, 99 and thus forms a cube through which at least two respective parallel through-bores 11, 12, 13, 14 pass which are formed on four of its six outer sides opposed in pairs, said through-bores as in the case of the two-part nodal-point body of the above-described kind being used for accommodating at least one respective rod-like supporting member 33, 34, 35, 36. Here, too, the diameter of the through-bores, the circumference of the supporting members 33 to 36 which may be tubes, and the spacing of the four parts of the cube along the planes of division 122 and 123 are dimensioned such that upon bolting of the four parts by means of the bolts indicated at 124, 125, 126 and 127 the four rod- or tube-like structural bodies seated in the rectangularly intersecting through-bores 11, 12, 13, 14 are clamped to the bore walls, whereby the entire structure is securely held together.

Figure 8:
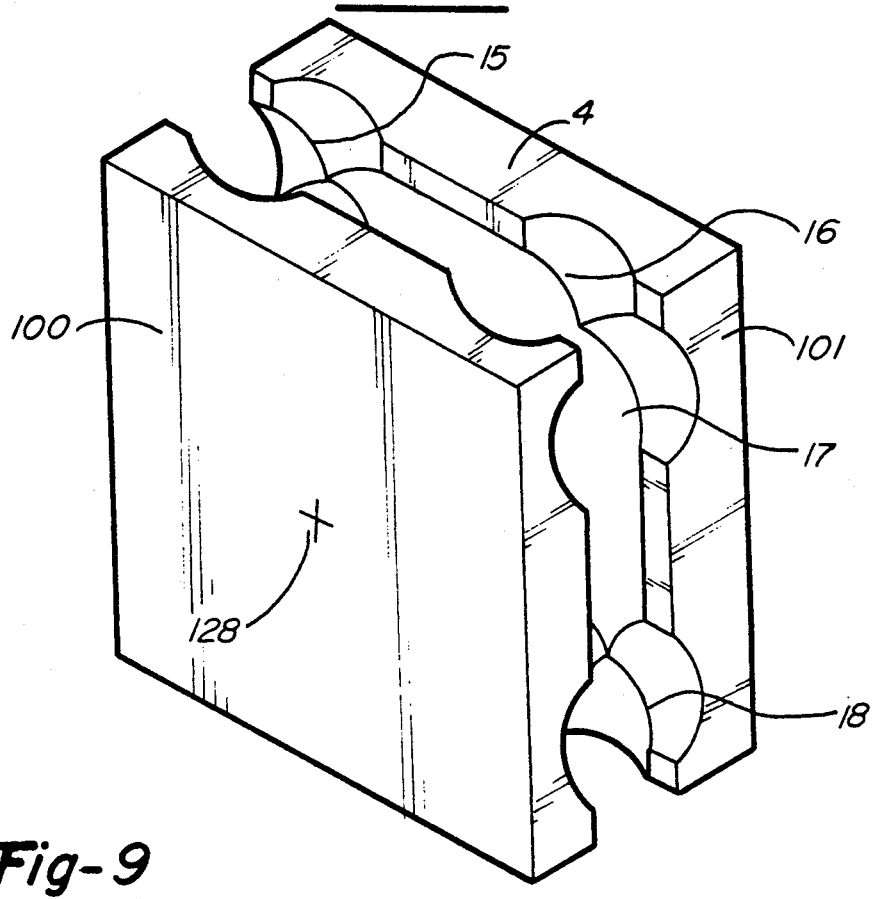

FIG. 8 is a perspective view of a further embodiment of a multi-part joinable nodal-point body 4 which in this case consists of a parallelepiped composed of two identical halves 100, 101 and which in its plane of division has two pairs of mutually rectangularly intersecting through-bores 15, 16, 17, 18 passing therethrough, said through-bores penetrating four of the six outer faces of the parallelepiped. As will be apparent from the practical examples illustrated in FIGS. 9a to 9f, these through-bores enable not only parallel rod-like bodies (FIG. 9a) to be inserted therein and to be fixedly joined by clamping the two halves 100 and 101 of the parallelepiped by means of a bolt schematically indicated at 128, but they also permit mutually rectangular rod-like structural bodies or tubes (as shown in FIG. 9b) or four rod-like structural bodies 40, 41, 42 and 43 meeting at right angles to each other (as shown in FIG. 9c) to be securely joined.

Figure 9:
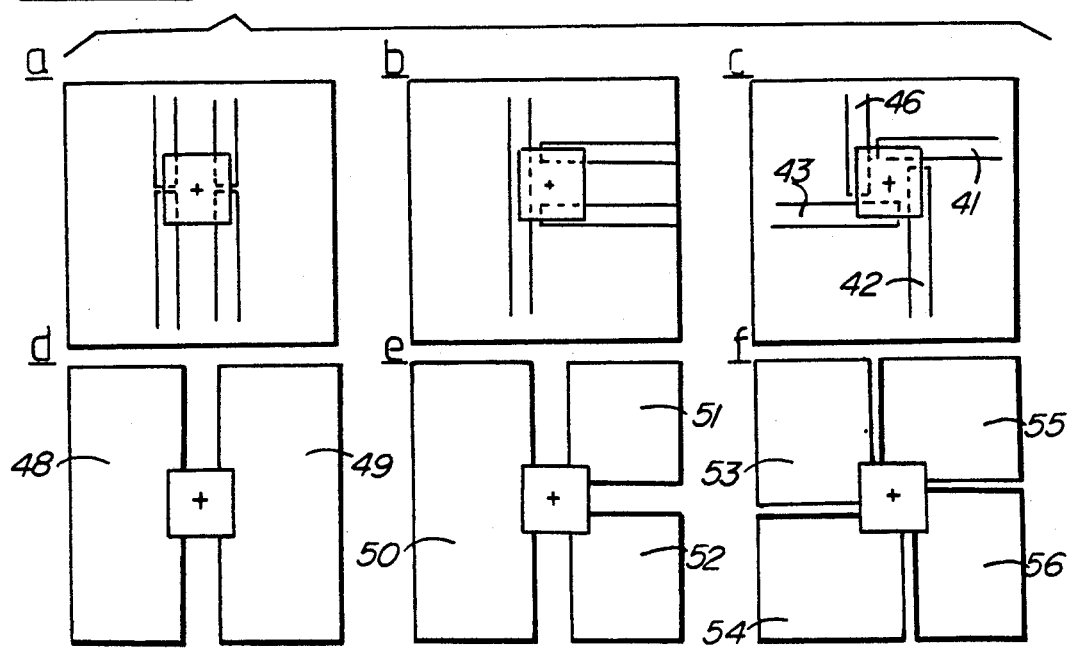

Moreover, by means of this two-part parallelepipedic nodal-point body 4 there is provided a coupling means for wall or base plates 48, 49 which are to be arranged in one plane (as shown in FIG. 9d), or for three such plates 50, 51, 52 (as shown in FIG. 9e), or even for four such plate-like bodies 53, 54, 55 and 56 which in that case (as shown in FIG. 9f) are respectively engaged by the nodal-point body at one of their four corners.

Figure 10:
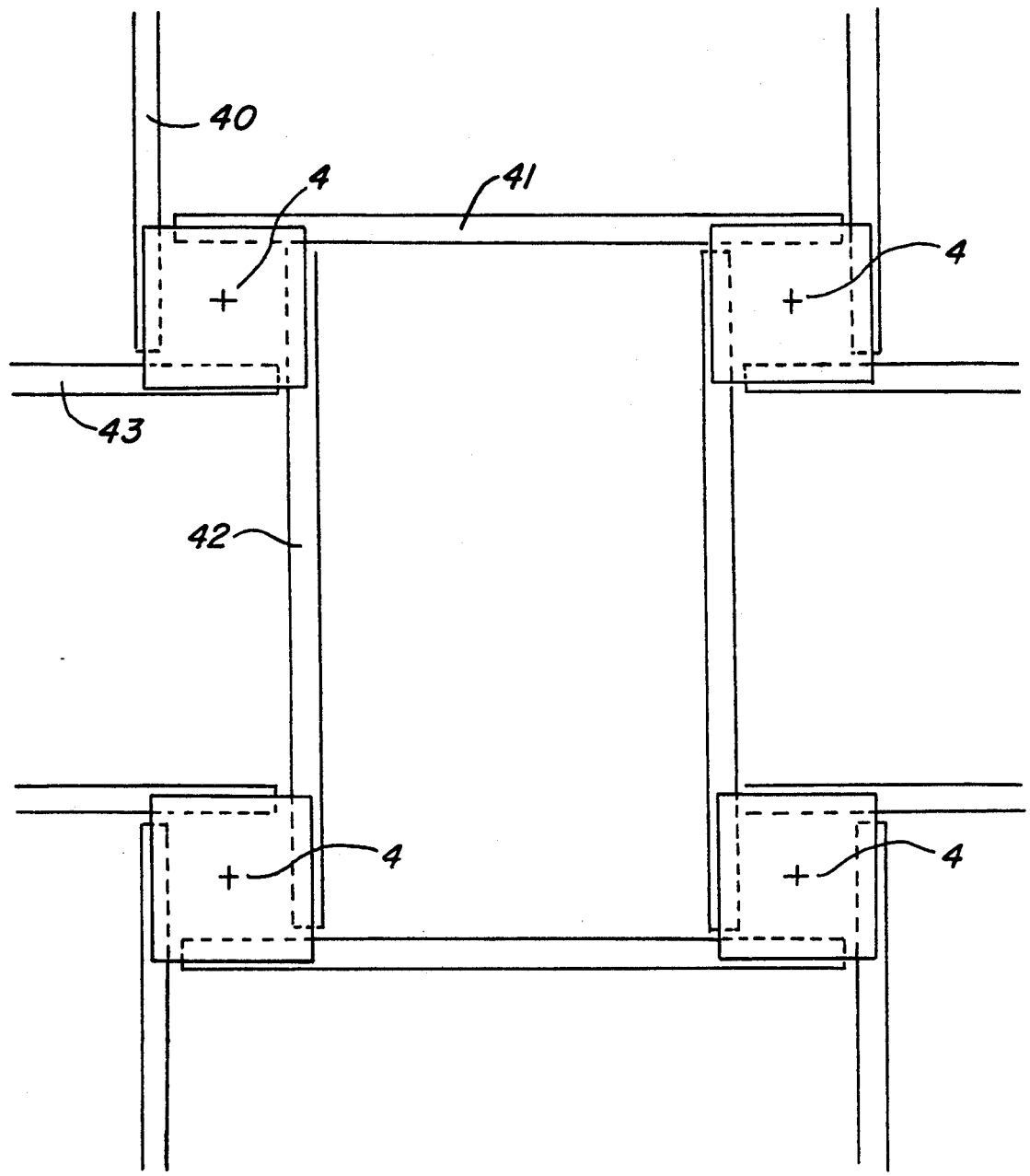

FIG. 10 illustrates an arrangement of a nodal-point body 4 as a coupling means for four meeting rod-like structural parts 40, 41, 42 and 43, which arrangement is similar to that of FIG. 9c but in which, for example, four such nodal-point bodies are adjacent each other in a single plane. This coupling example is intended to show that such nodal-point bodies may be used, for instance, as securing means for suspended ceilings, in which case the ceiling elements are suspended from the rod-like structural bodies which interconnect the various nodal-point bodies.

Figure 11:
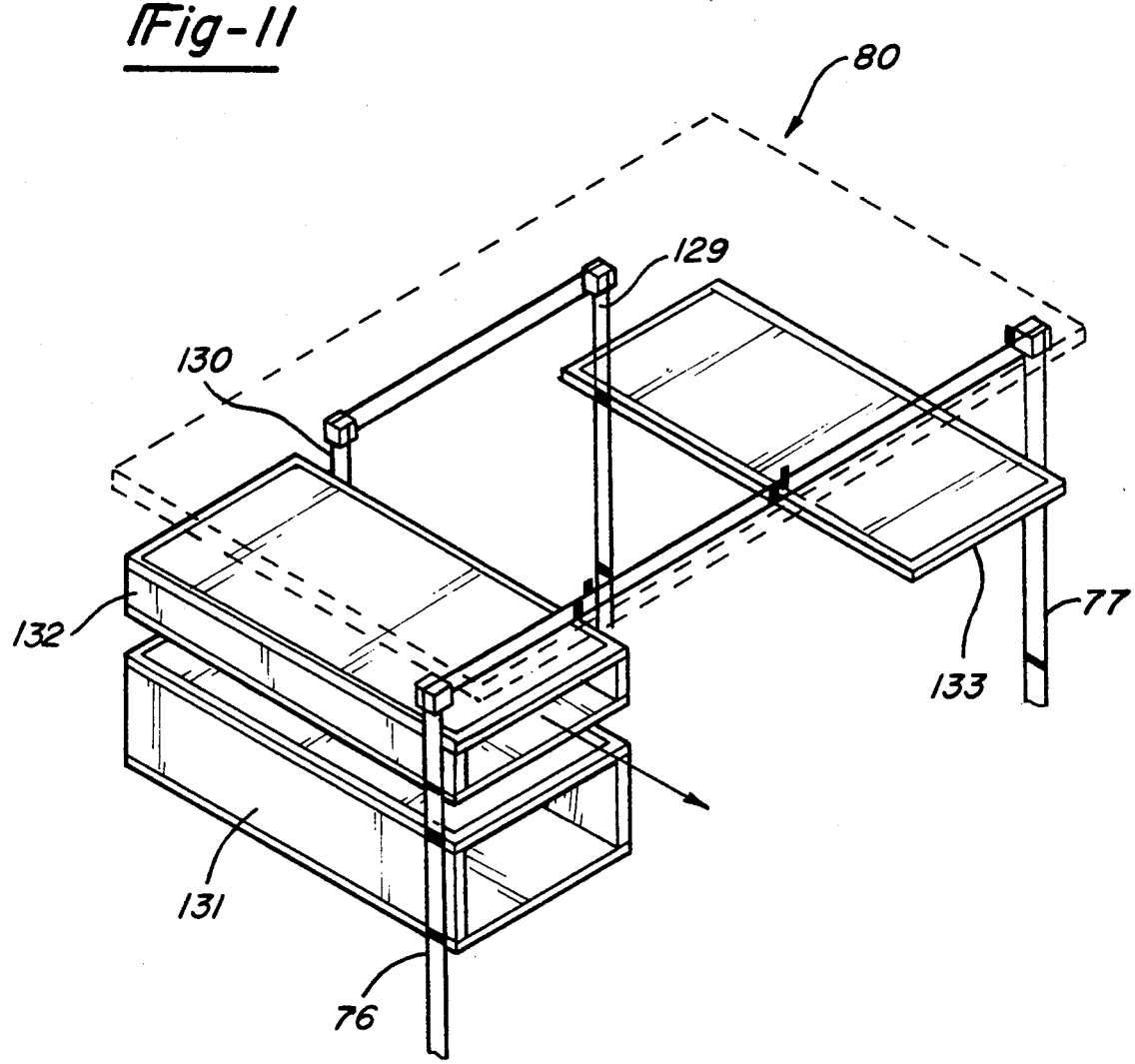
Figure 12:
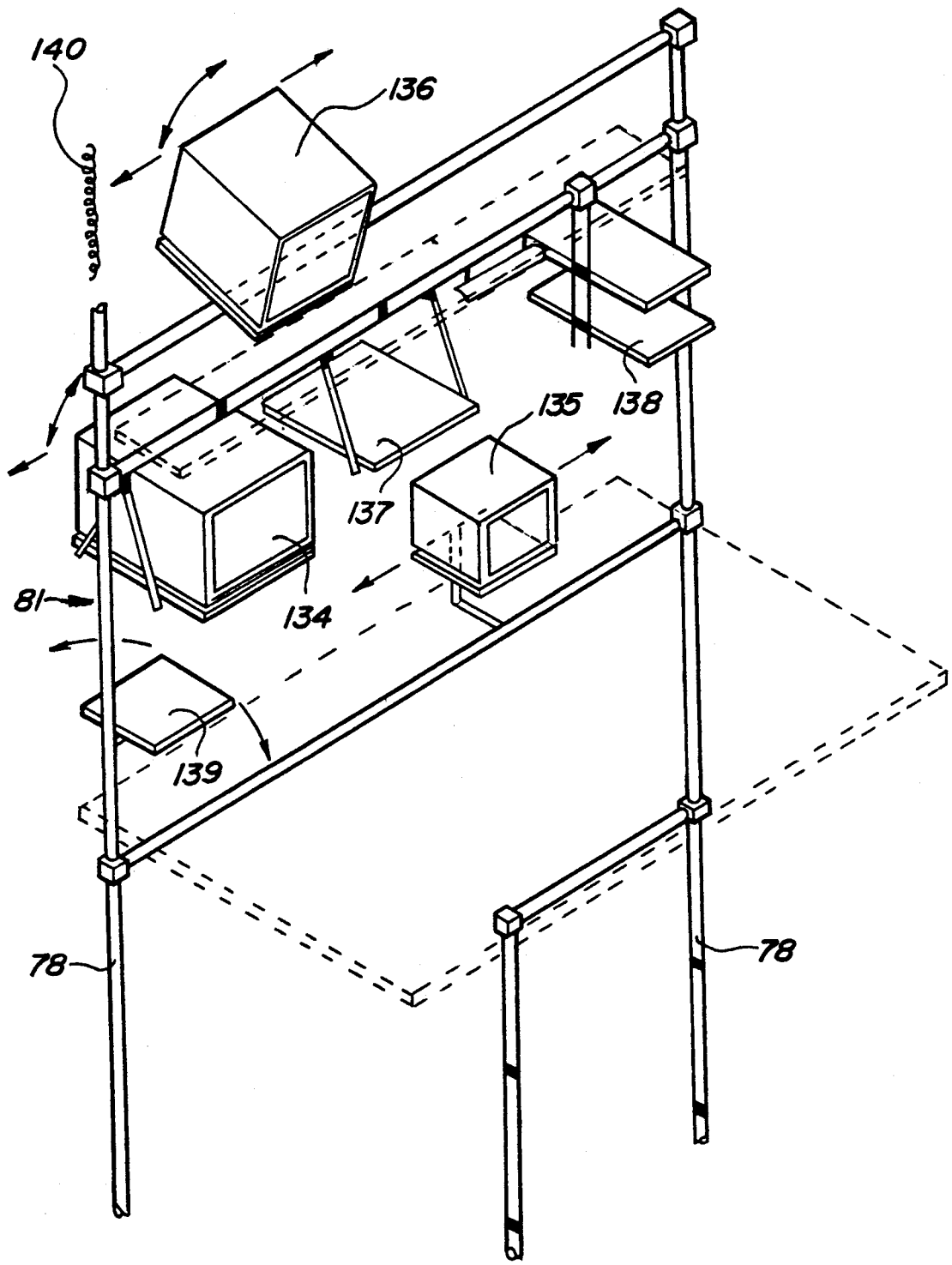

FIGS. 11 and 12 illustrate specific examples of use of the described modular system; FIG. 11 shows a desk 80 the four-legs 76, 77, 129, 130 of which consist of two respectively parallel tubes of the kind indicated at 31 and 32 in FIG. 1 and retained by nodal-point bodies 1 or 120 which at the same time serve as retaining means for the box elements 131, 132 and the intermediate panel 133. These box elements can be assembled in the manner illustrated in FIG. 6, i.e. by means of frame bodies 87 which are provided with corresponding panels 88a, or by means of plate-like wall bodies 88, 89. In respect of the intermediate panel 133, the same composition of a frame body 87 with a panel is conceivable.

At the upper ends of the desk legs nodal-point bodies of the kind referenced 4 in FIG. 8 are provided which simultaneously accommodate the horizontal rod-like structural bodies that interconnect the upper ends of the desk legs so that a solid supporting structure for the mentioned boxes and boards of the desk is obtained which receives the desk top indicated in dashed lines in FIG. 11.

FIG. 12 demonstrates the assembly of a working place 81 equipped with electrical monitoring devices 134, 135, 136 and associated consoles 137, 138, 139, which are movably mounted on horizontally extending rail-like structural parts of the kind indicated at 35 and 36 in FIG. 7 by means of nodal-point bodies described in connection therewith, wherein the horizontal rails in their turn are fixed with their ends via nodal-point bodies 3 qr 4 at desired levels or distances from the ground to upright legs which may, for instance, correspond to the rod-like structural bodies 33 and 34 of FIG. 7 or 37 and 38 of FIG. 3. When such rod-like structural bodies are tubular members, which is usually the case, the electrical leads required for the electrical appliances can be passed therethrough as indicated at 140 in FIG. 12. For the rest, the directional arrows in this figure indicate the possible shifting or pivoting of the electrical appliances. In this case, too, the provision of a working top at table level is conceivable, such working top being only indicated in dashed lines.

Figure 13:
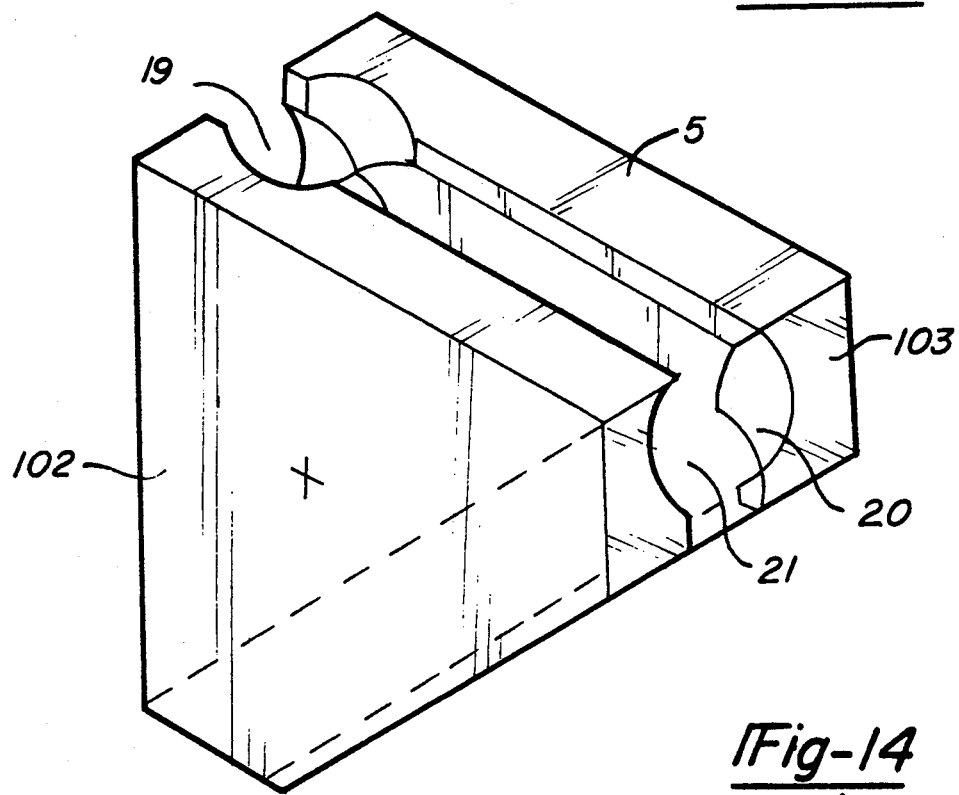
Figure 14:
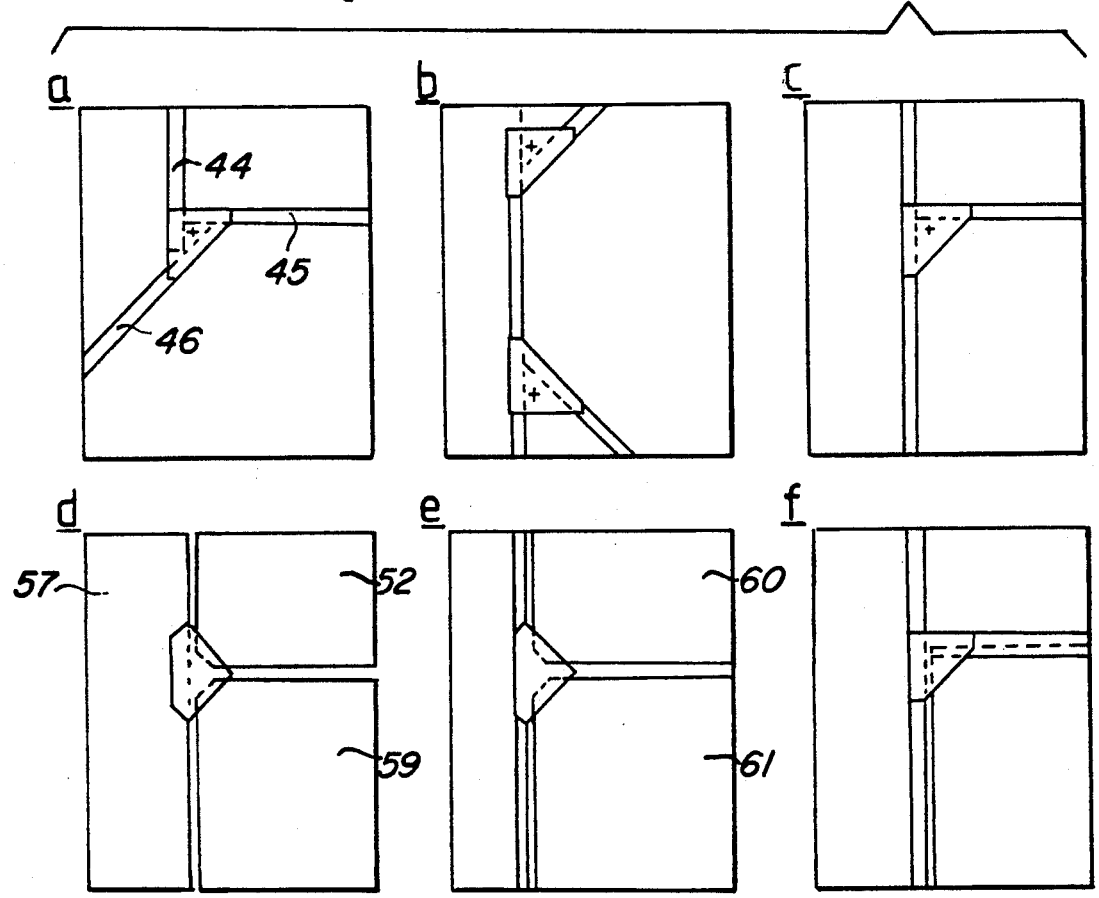

As illustrated at 5 in FIG. 13, the nodal-point body may also be a parallelepiped composed of two equal halves 102 and 103 and having approximately triangular shape, said body in its plane of division, which extends in parallel to two mutually opposed side faces, having three through-bores 19, 20 and 21 passing therethrough which extend in parallel to faces forming the outer sides of the triangle. The extension of the bore 21 is indicated in dashed lines. As will be apparent from the practical examples illustrated in FIGS. 14a to 14f, this nodal-point body is particularly suited for interconnecting rod-like structural bodies 44, 45, 46 (FIG. 14a) which do not meet at right angles, but it is also suited for connecting a single straight rod-like structural body with a structural body meeting the former perpendicularly thereto (FIG. 14c), or for interconnecting two structural bodies of this kind meeting a continuous rod-like body at respective angles thereto (FIG. 14b). Furthermore this parallelepipedic nodal-point body also offers the possibility of interconnecting three plate-like structural bodies 57, 58 and 59 (FIG. 14d), or a rod-like structural body and two plate-like structural bodies 60, 61 (FIG. 14e), and finally for interconnecting differently arranged structural bodies (FIG. 14f); these are but a few examples of possible applications of the nodal-point body 5 within the scope of the modular system according to the present invention.

Figure 15:
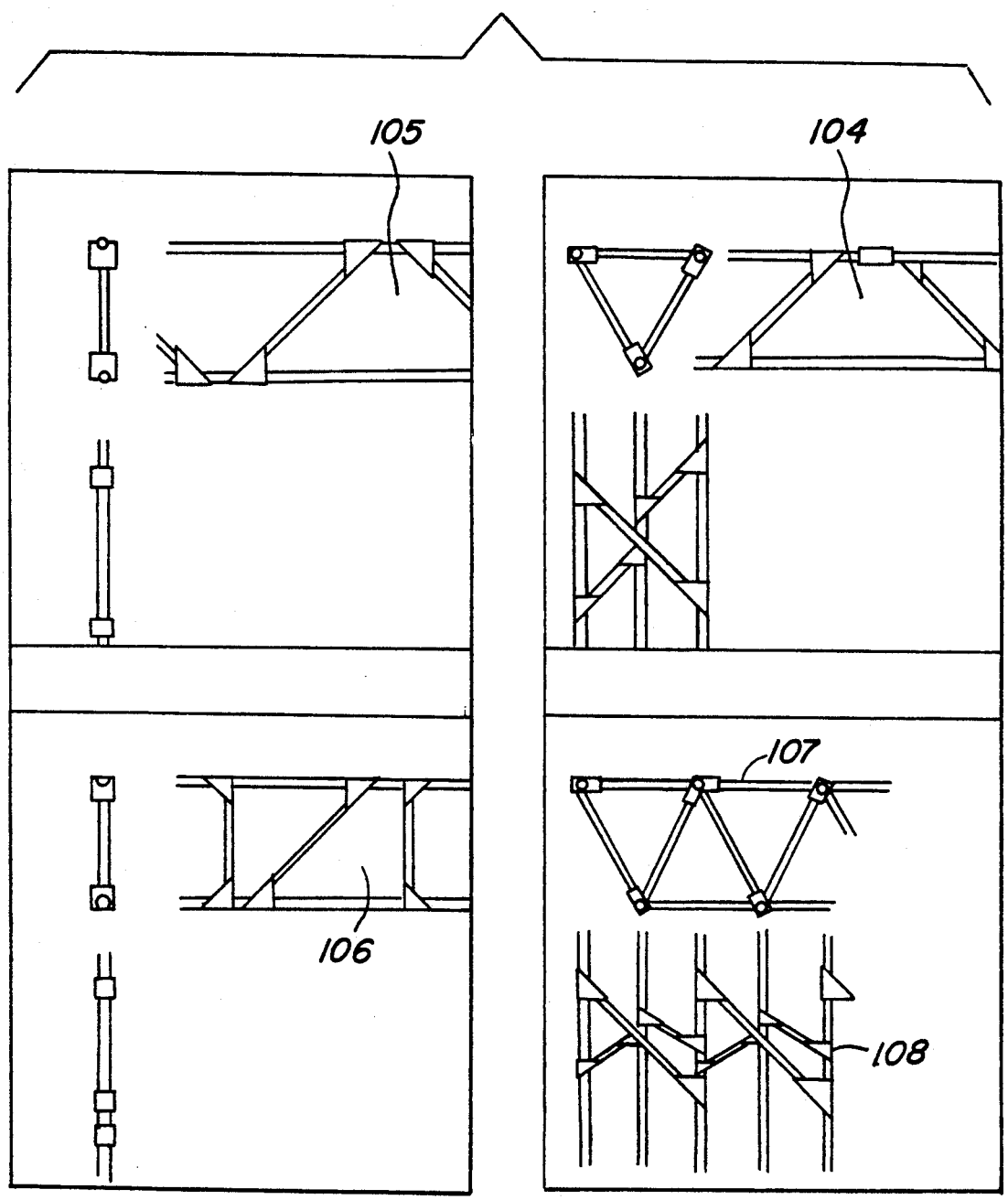

In cases where framework trusses with rod-like or tubular elements comprising upper and lower joists are to be connected by inclined connecting rods, the nodal-point body 5 of FIG. 13 may also be used, as illustrated in FIGS. 15a to 15d, as a diagonal connecting member as in the case of the framework trusses 104, 105 and 106 illustrated as side and front view in FIGS. 15a to 15c. Moreover it is apparent from FIG. 15d that by means of such nodal-point bodies also a multiplicity of parallel rods can be interconnected by connecting rods as shown at 107 and 108, respectively.

Figure 16:
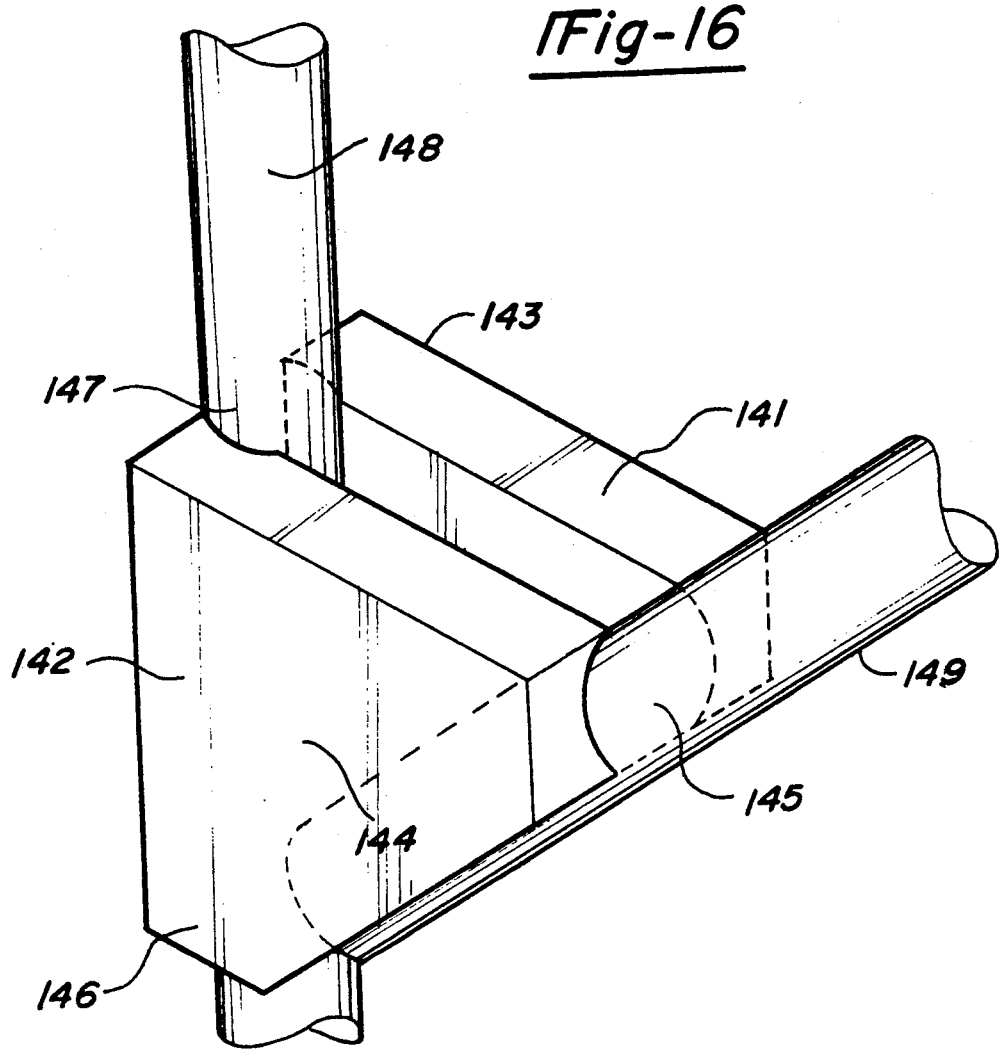
Figure 17:
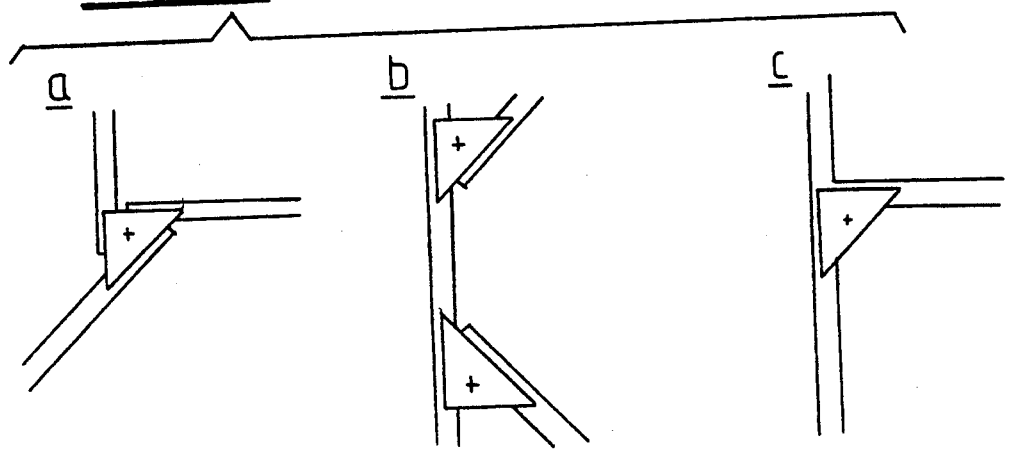

FIG. 16 illustrates a nodal-point body 141 which is similar to the parallelepipedic nodal-point body 5 of triangular shape of FIG. 13. This body likewise is composed of two equal halves 142, 143 which can be bolted together by means of a bolt indicated at 144 so that the rod-like structural parts 149 and 148 inserted into the through-bores 146, 147 of said body can be connected by a clamping effect. In contrast to the nodal-point body 5, however, in the nodal-point body 141 the three through-bores 145, 146, 147 which extend in parallel to the side faces defining the triangular shape of the parallelepiped are shifted so far outwardly that a portion of the clamped rod-like structural parts protrudes beyond said outer sides, so that the interconnections illustrated in schematic plan view of FIGS. 17a to 17c will result for mutually abutting rod-like structural parts.

Figure 18:
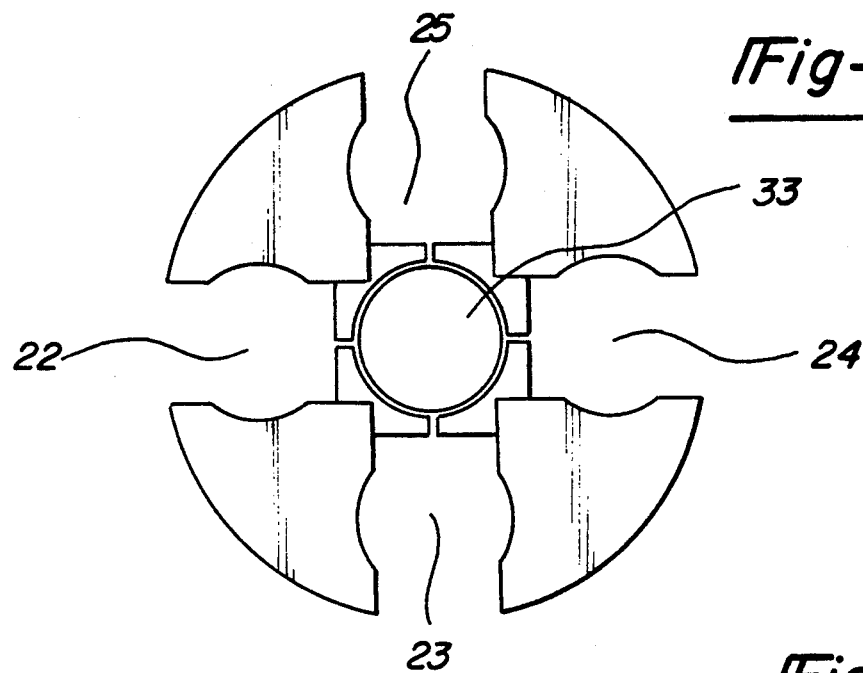
Figure 19:
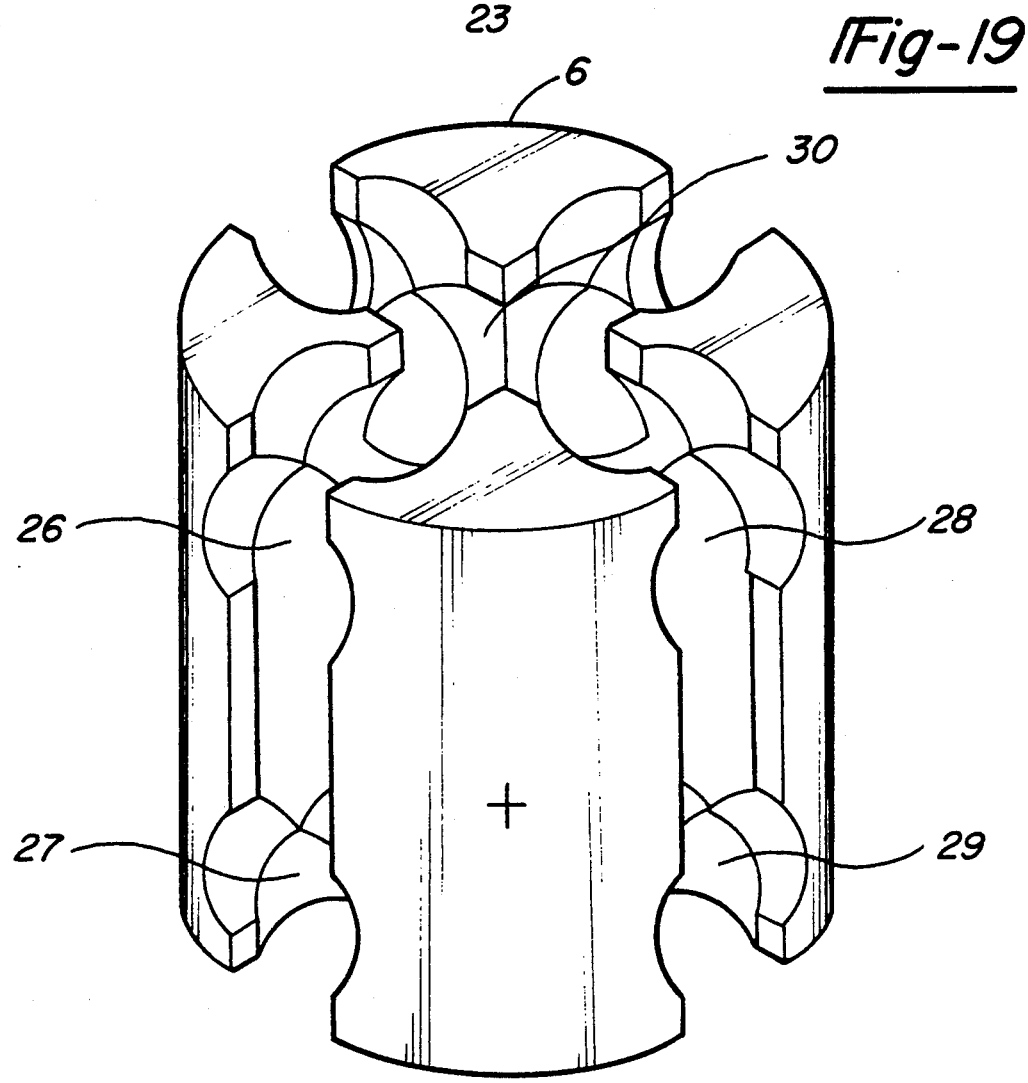
Figure 20:
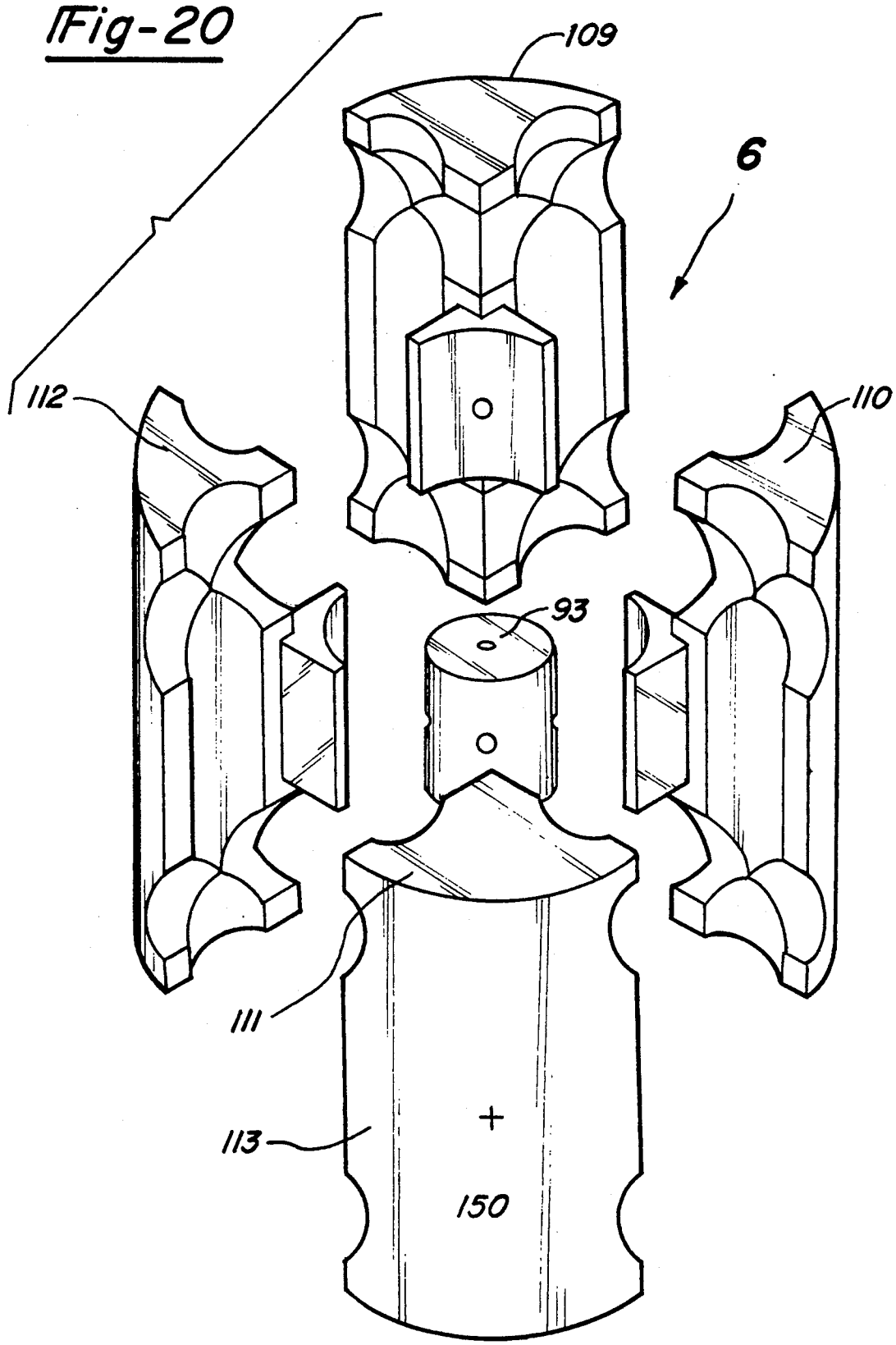
Figure 21:
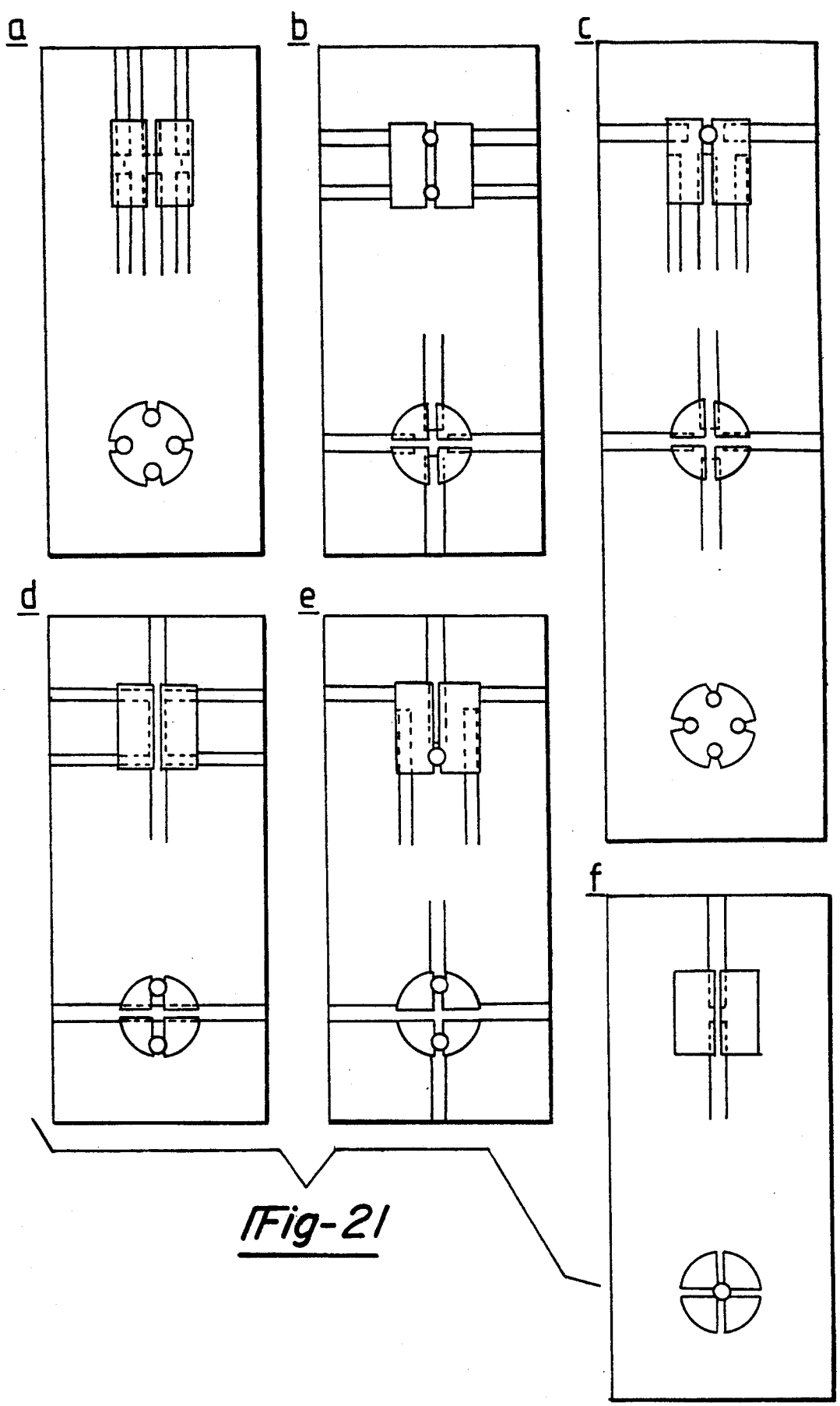

The FIGS. 18 to 20 illustrate a still further embodiment of the multi-part connectable nodal-point body 6 useful in the described modular system, which forms a cylinder of four identical, axially symmetrical parts 109, 110, 111 and 112 provided with four identical, equidistant axially parallel through-bores 22, 23, 24, 25 and four additional through-bores 26, 27, 28, 29 penetrating the cylinder circumference and intersecting each other at right angles and extending at right angles to the axially parallel through-bores. This nodal-point body offers a possibility of interconnecting a large number of rod-like and/or plate-like structural parts, FIGS. 21a to 21f showing a few practical examples thereof. To this end rod-like or tubular structural parts or supporting members, which cross the through-bores (FIG. 21a) or which meet therein (FIG. 21b, 21c and 21f) can be securely clamped in the through-bores 22, 23, 24, 25, 26, 27, 28, 29, or plate-like supporting elements can be fixed therein, as illustrated in FIGS. 21d and 21e.

For interconnecting the four identical, axially symmetrical parts 109, 110, 111, 112 of the cylinder of the nodal-point body 6, which parts are arrayed about a common axially extending bore 30, a cylindrical core body 93 is used which is inserted in the bore as shown in FIGS. 18 and 20 and is connected to form an integral cylinder by means of externally provided fastening bolts 150 schematically indicated in FIG. 20 and penetrating from all four sides into the core body 93, said cylinder by way of its through-bores for the individual rod-like and/or plate-like structural parts performing the same clamping function as the above-described nodal-point bodies 1, 2, 3, 4, 5 of simpler configuration.

Figure 22:
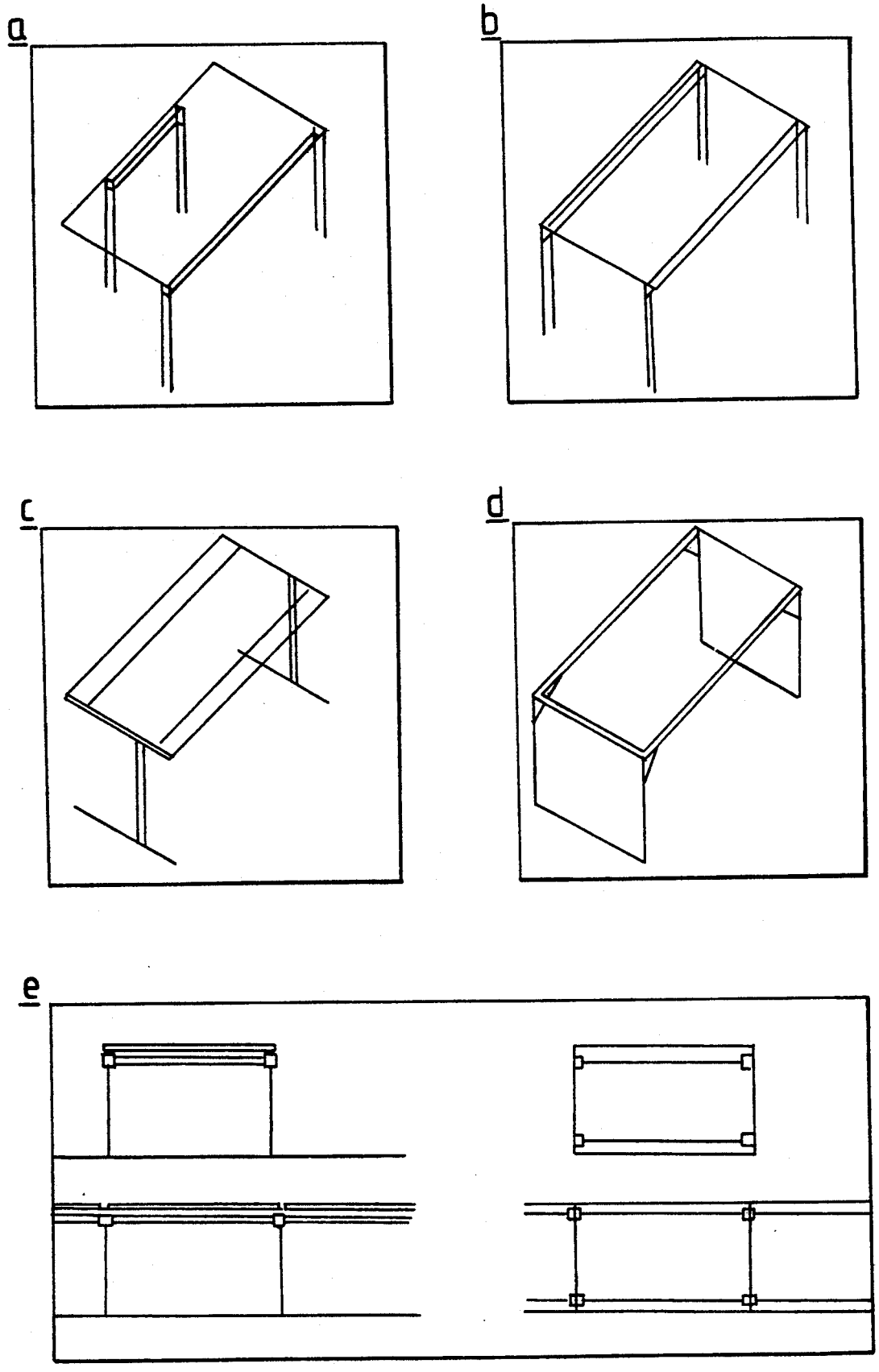

FIGS. 22a to 22e again illustrate some practical examples showing the application of the described modular system for providing articles of furniture. FIG. 22a shows an unsymmetrical table, FIG. 22b shows a usual table having its four legs disposed at the table corners and the table top supported along its entire length by rod-like structural parts extending transversely to the legs.

FIG. 22c illustrates a table set up on a pedestal with T-shaped feet for use as a sofa table.

FIG. 22d illustrates a kind of working table or desk including closed sidewall elements which are set up by means of the above-described connectable nodal-point bodies serving as retaining members and rod-like and-/or plate-like structural bodies serving as supporting members.

FIG. 22e illustrates the possible setting-up of endless tables, especially conference tables, from individual table elements which are illustrated in the upper left-hand half as a side view and on the right-hand side as a plan view. When several of these single tables are interconnected at their end faces by means of the above-described nodal-point bodies, rows of tables of varying lengths will be obtained; an example is indicated in the lower part of FIG. 22e as a side and a plan view, respectively. Of course, such endless tables may also be assembled to form annular tables provided the tops are cut accordingly. To this end it would only be necessary, for instance, in case of the unsymmetrical table shown in FIG. 22a to cut off the nonsupported areas of the table top and to provide the adjacent neighbouring tables with correspondingly obliquely cut table tops.

Aluminium has proven an especially useful material for the nodal-point bodies but also for the rod-like structural bodies, although plastic material and other metals could likewise be used provided they have the required strength and dimensional stability. The above-described retaining or clamping members can be mounted on the supporting members at any desired locations and especially any desired levels. Bolts, wedges, rivets and the like could be used, for instance, as fastening means. But welding of clamping and supporting members is also possible provided the interconnections are not intended for subsequent disengagement.

I claim:

1. A modular system for setting up furniture, racks and frameworks, especially office workspace equipment, comprising:

a plurality of components adapted to be interconnected;

means interconnecting said plurality of components comprising supporting members and retaining members;

wherein each retaining member comprises a plurality of parts forming a multi-part combinable nodal-point body and includes at least a pair of parallel through-bores, said parts being split along a common diametric plane extending centrally through said pair of parallel through-bores; and wherein each supporting member comprises a structural body having a longitudinal extent dimensioned to be inserted into one of said through-bores and clamped therein by said retaining member parts, thereby being securely joined to said nodal-point body;

characterized in that the multi-part combinable nodal-point body is a cube divided along two mutually orthogonal planes into four equal parts, said cube on four of its six outer sides which oppose each other in pairs being formed with at least two respective parallel through-bores extending therethrough for accommodating therein at least one respective supporting member, said supporting members upon assembly of the four parts of the cube to form the nodal-body being securely joined thereto.

2. The modular system as claimed in claim 1, characterized in that the supporting members comprise at least one of tubes and plates.

3. The modular system as claimed in claim 2, characterized in that the tubes are legs and the plates are wall elements of articles of furniture.

4. A modular system for setting up furniture, racks and frameworks, especially office workspace equipment, comprising:
   a plurality of components adapted to be interconnected;
   means interconnecting said plurality of components comprising supporting members and retaining members;
   wherein each retaining member comprises a plurality of parts forming a multi-part combinable nodal-point body and includes at least a pair of parallel through-bores, said parts being split along a common diametric plane extending centrally through said pair of parallel through-bores; and
   wherein each supporting member comprises a structural body having a longitudinal extent dimensioned to be inserted into one of said through-bores and clamped therein by said retaining member parts, thereby being securely joined to said nodal-point body. characterized in that the multi-part combinable nodal-point body is a cylinder composed of four identical axially symmetrical parts, and cylinder having extending therethrough four identical, equidistant, axially parallel through-bores which intersect each other at right angles and extend at right angles to the axially parallel through-bores and penetrate the cylinder circumference.

5. The modular system as claimed in claim 4, characterized in that within the through-bores at least one of planar and tubular supporting members can be secured which cross said through-bores or abut each other within said through-bores.

6. The modular system as claimed in claim 4, characterized in that the four equal, axially symmetrical parts of the cylinder have a common axially extending bore adapted to receive therein a cylindrical core body serving as joining element for said four parts.

7. A modular system for setting up furniture, racks and frameworks, especially office workspace equipment, comprising:
   a plurality of components adapted to be interconnected;
   means interconnecting said plurality of components comprising supporting members and retaining members;
   wherein each retaining member comprises a plurality of parts forming a multi-part combinable nodal-point body and includes at least a pair of parallel through-bores, said parts being split along a common diametric plane extending centrally through said pair of parallel through-bores; and
   wherein each supporting member comprises a structural body having a longitudinal extent dimensioned to be inserted into one of said through-bores and clamped therein by said retaining member parts, thereby being securely joined to said nodal-point body;
   characterized in that the multi-part combinable nodal-point forms a parallelepiped composed of two equal halves and having approximately triangular shape, said body in its plane of division, which extends in parallel to the two mutually opposed side faces, having three through-bores passing therethrough and extending in parallel to faces forming the outer sides of the triangle, in which three through-bores elongated structural bodies abutting to one another can be fixed in order to form a framework, and that in the three through-bores at least one of planar and elongated structural bodies can be interconnected.

* * * * *